Feb. 14, 1961 J. L. HOLLIS 2,971,559
APPARATUS FOR MAKING PNEUMATIC AIR SPRINGS
Filed Dec. 5, 1956 10 Sheets-Sheet 1

INVENTOR.
JACK L. HOLLIS
BY W. A. Fraser
ATTY.

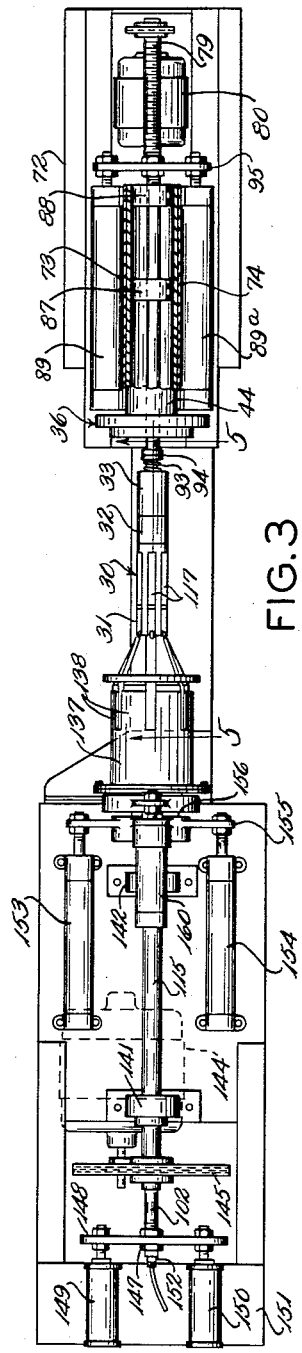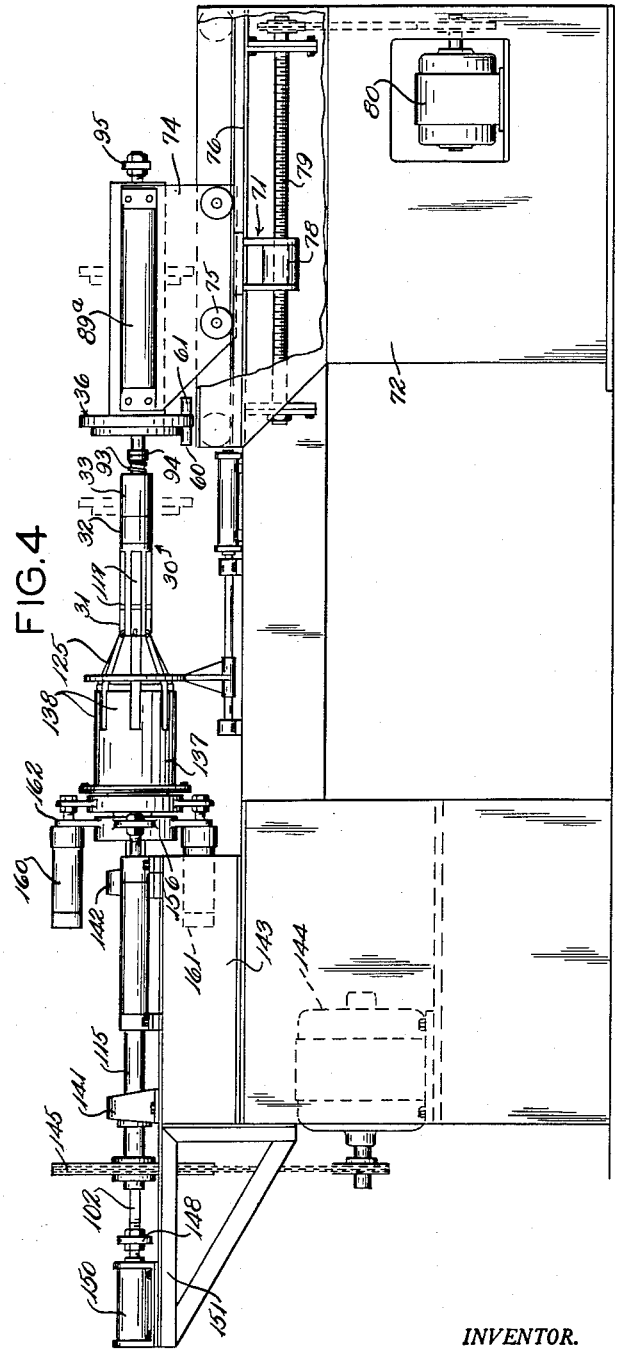

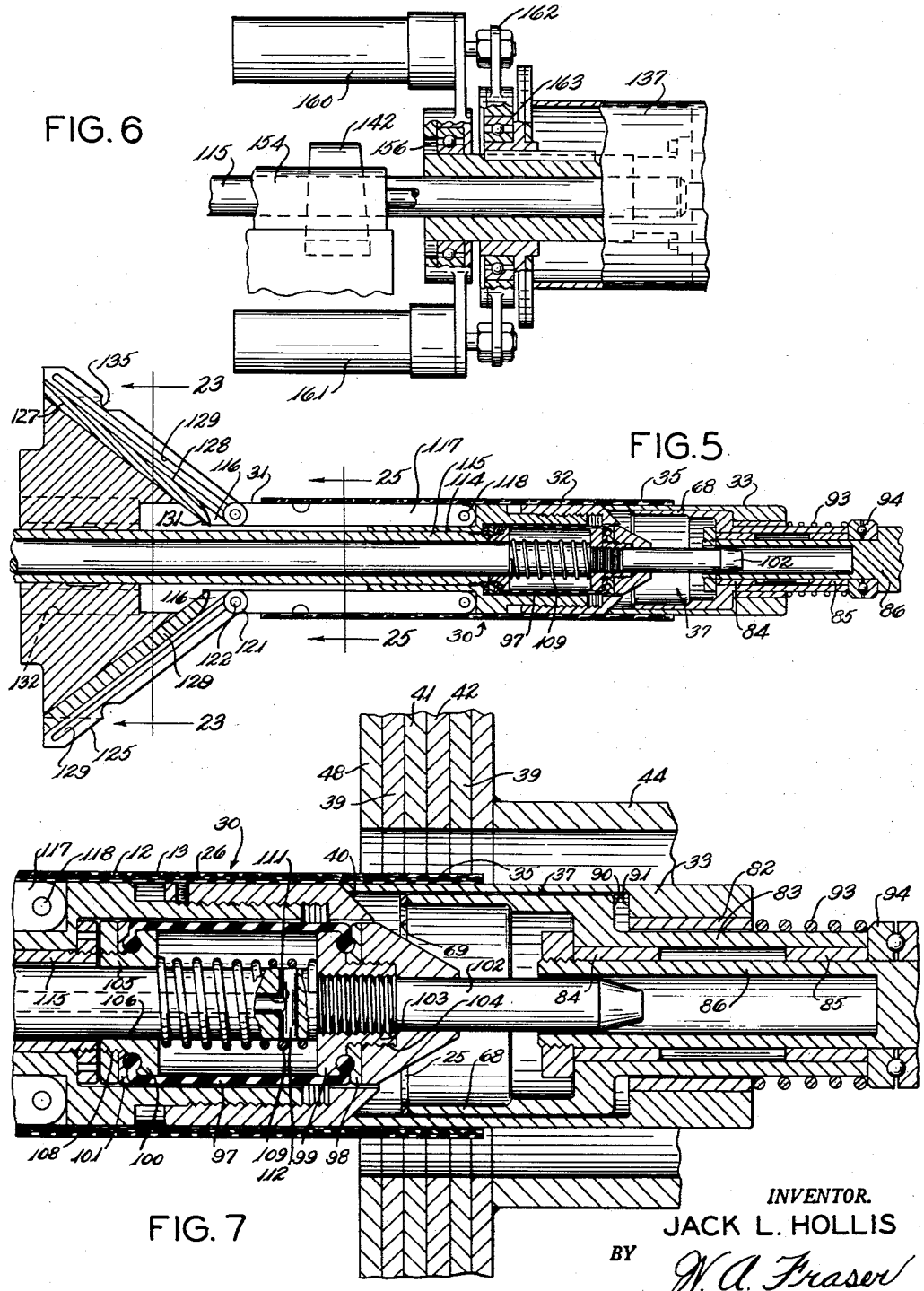

INVENTOR.
JACK L. HOLLIS
BY
W. A. Fraser
ATTY.

*INVENTOR.*
JACK L. HOLLIS
BY W. A. Fraser
ATTY.

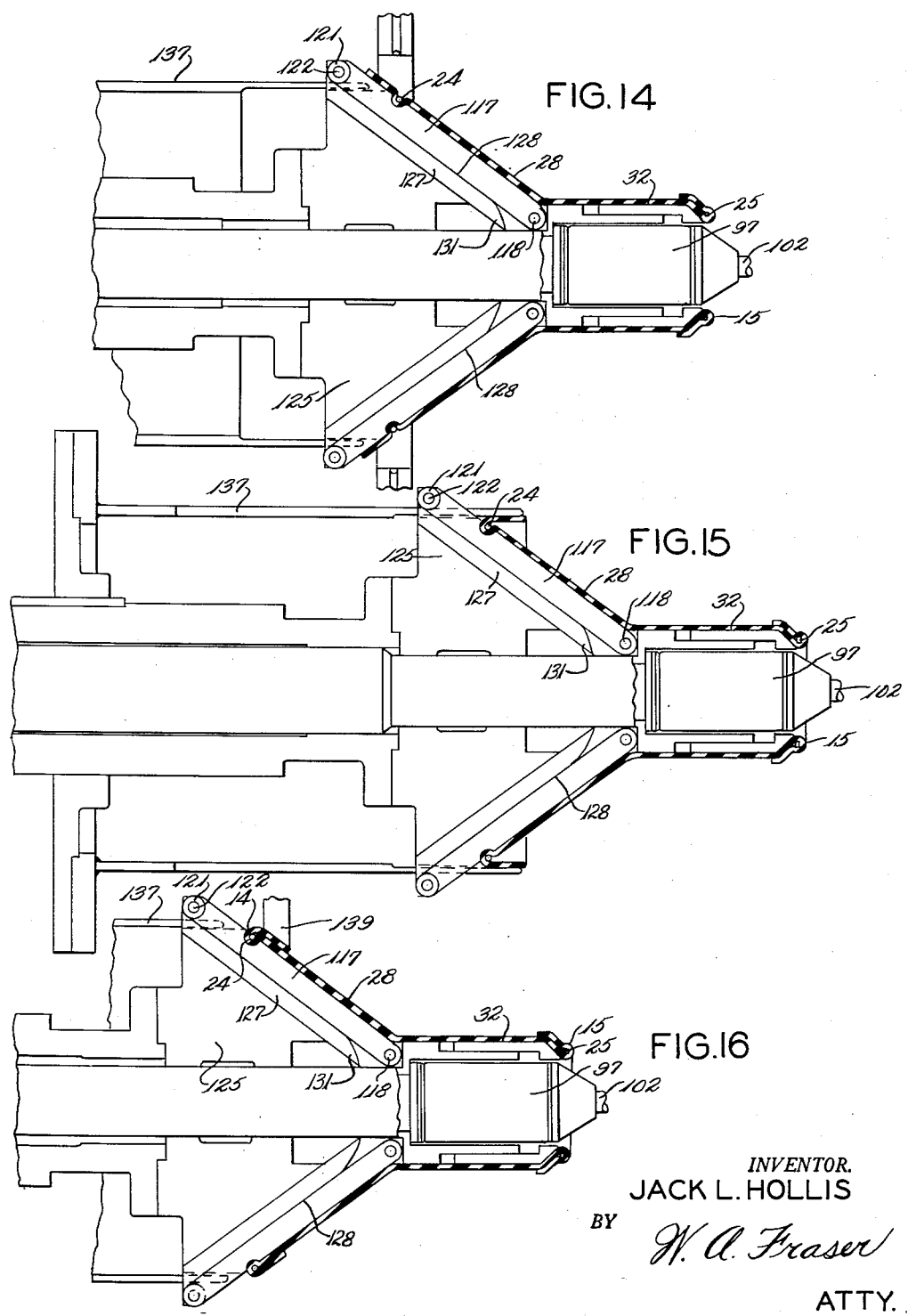

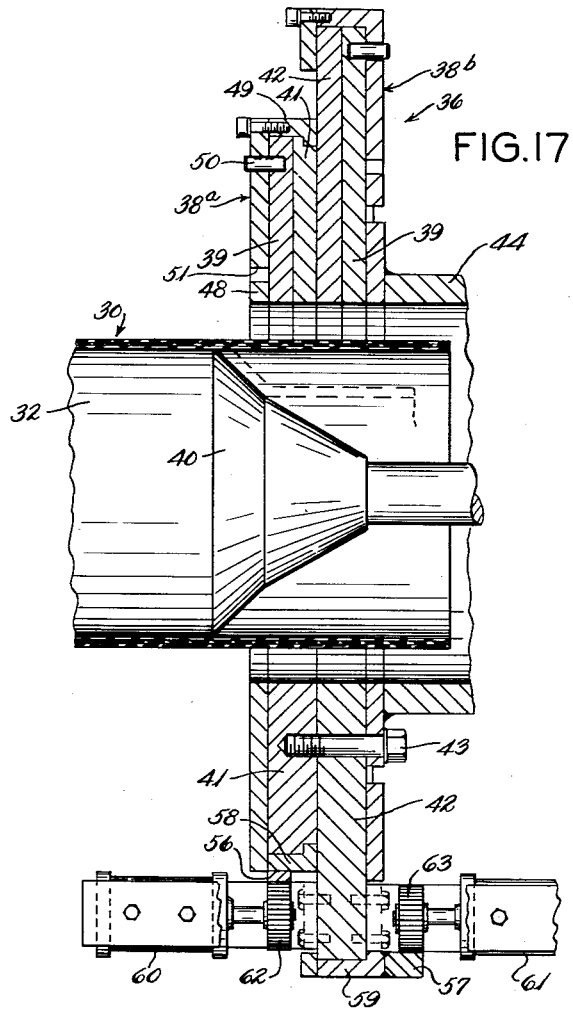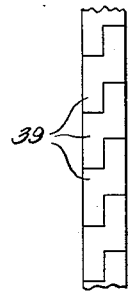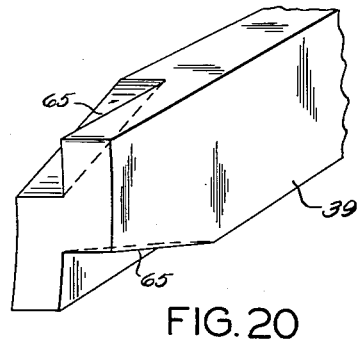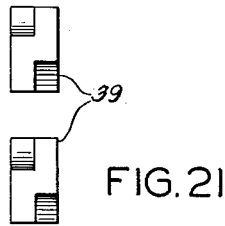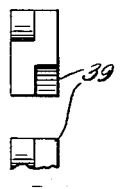
Feb. 14, 1961     J. L. HOLLIS     2,971,559
APPARATUS FOR MAKING PNEUMATIC AIR SPRINGS
Filed Dec. 5, 1956     10 Sheets-Sheet 7
INVENTOR.
JACK L. HOLLIS
BY W. A. Fraser
ATTY.

Feb. 14, 1961 J. L. HOLLIS 2,971,559
APPARATUS FOR MAKING PNEUMATIC AIR SPRINGS
Filed Dec. 5, 1956 10 Sheets-Sheet 8

INVENTOR.
JACK L. HOLLIS
BY *W. A. Fraser*
ATTY.

Feb. 14, 1961    J. L. HOLLIS    2,971,559
APPARATUS FOR MAKING PNEUMATIC AIR SPRINGS
Filed Dec. 5, 1956    10 Sheets-Sheet 9

INVENTOR.
JACK L. HOLLIS
BY
W. A. Fraser
ATTY

INVENTOR.
JACK L. HOLLIS
BY
*W. A. Fraser*
ATTY.

United States Patent Office 2,971,559
Patented Feb. 14, 1961

2,971,559
APPARATUS FOR MAKING PNEUMATIC AIR SPRINGS

Jack L. Hollis, Akron, Ohio, assignor to The Firestone Tire & Rubber Company, Akron, Ohio, a corporation of Ohio Filed Dec. 5, 1956, Ser. No. 626,451

32 Claims. (Cl. 154—1)

This invention relates to pneumatic bellows of the type known as air springs and more particularly to an improved method and apparatus for manufacturing such air springs.

A recently developed air spring which is especially useful in automotive wheel suspensions consists of a single convolution body terminating in beads having appreciably different diameters so that the smaller bead is capable of passing toward and through the larger bead in a telescoping movement when the air spring is deflected in service. The air spring is filled with air under pressures which are usually in the range of about 70–80 pounds per square inch, but which often attain levels in the range of 100 to 150 pounds per square inch.

Such an air spring requires a sufficient flexibility to undergo the above-mentioned telescoping movement for a great many cycles and must have a mechanical strength adequate to retain the highest fluid pressures to which it may be subjected. These requirements of flexibility and of mechanical strength are in large measure incompatible with each other and are difficult to obtain in an air spring of this design except by the most favorable methods of manufacture.

According to the present invention, an air spring having these properties is manufactured by assembling plies of essentially weftless fabric in the form of a cylindrical body on a building drum having a diameter intermediate the diameters of the large and small beads, i.e. having a diameter larger than the small bead and smaller than the large bead. One end of the body is turned radially inwardly over the adjacent end of the building drum to a small diameter in order that it may receive and be wrapped around the core of the small bead. This ply-contracting operation crowds the cords of the fabric plies together and is performed in a manner to minimize wrinkling of the fabric plies in that area, for the presence of wrinkles will detract from the flexibility and strength of the air spring.

The plies at the other end of the air spring are expanded outwardly to a larger diameter in order that they may be wrapped about and anchored to the core of the larger bead. In this operation, the cords of the plies become more widely spaced and this operation is done in such a manner as to produce uniform spacing of the cords. This is important because the mechanical strength and imperviousness of this expanded portion of the air spring depends, in part, upon the rubber which bridges across adjacent cords and non-uniform spacing of the cords might well result in locally weak areas.

Accordingly it is a general object of the invention to provide an improved apparatus and method for manufacturing such air springs.

Another object is to provide apparatus for expanding the fabric plies of a cylindrical air spring body into a flaring form.

Another object is to provide improved means for contracting rubberized fabric plies having an initial cylindrical form into inwardly extending flanged form.

Another object is to provide improved means for turning fabric plies about inextensible bead rings to form compact and strong bead structures.

Yet another object is to provide a method of building an air spring which consists in first assembling air spring plies in cylindrical form and then expanding and contracting the plies at opposite ends to form a body of flaring bell-shaped form.

Further objects are to provide an apparatus for manufacturing air springs which is simple and effective in design which is virtually automatic in operation, requiring minimum skill in its use; which is rugged in service, requiring a minimum of maintenance.

These and further objects and advantages will more fully appear from the following description of a preferred form of the invention, reference being had to the accompanying drawings in which:

Figure 3 is a top elevation of an air spring building drum and associated apparatus embodying the present invention;

Figure 4 is a side elevation of the apparatus of Figure 3;

Figure 5 is a longitudinal sectional view, on an enlarged scale, of the air spring building drum of Figures 3 and 4, with the fabric body plies shown in place on the drum, the view being taken in the plane indicated by the lines 5—5 in Figure 3;

Figure 6 is a fragmentary view showing the portion to the left of the drum of Figure 5;

Figure 7 is a view on a somewhat larger scale than that of Figure 5 showing the right-hand portion of the building drum;

Figure 8 shows the plies assembled on the drum with the ply-contracting mechanism about to be moved into position at the end of the fabric plies;

Figure 9 shows the manner in which the plies are turned radially inwardly over the right end of the building drum by the ply-contracting mechanism;

Figure 10 shows the setting of a bead ring against the inturned plies;

Figure 11 shows the inturned plies turned out into cylindrical form by a ply-stitching bag, the bag being moved into position to turn up the plies outwardly about the bead;

Figure 12 shows the ply-stitching bag partially expanded to begin the turn-up of plies outwardly around the bead ring;

Figure 13 shows the ply-stitching bag fully expanded and the plies turned and stitched about the bead ring;

Figure 14 shows the left-hand portion of the building drum expanded to force the body plies outwardly into position to engage a second bead ring of large diameter as compared to the first;

Figure 15 shows the manner in which a ply-turning sleeve engages and turns the expanded ends of the body plies inwardly about the large bead ring;

Figure 16 shows the manner in which a stitching roll finishes the ply-turning operation about the large bead ring;

Figure 17 is a sectional view showing the ply-contracting mechanism on an enlarged scale, the section being taken as indicated by the lines 17—17 of Figure 18;

Figure 20 is a perspective view showing the ply-engaging end of one of the fingers of the ply-contracting mechanism of Figures 17–19;

Figure 21 is a somewhat diagrammatic view showing the ends of several ply-engaging fingers in the fully retracted position;

Figure 22 is a view similar to Figure 21 showing the manner in which the ends of the fingers intermesh to form a continuous surface to engage the plies;

Figure 1:
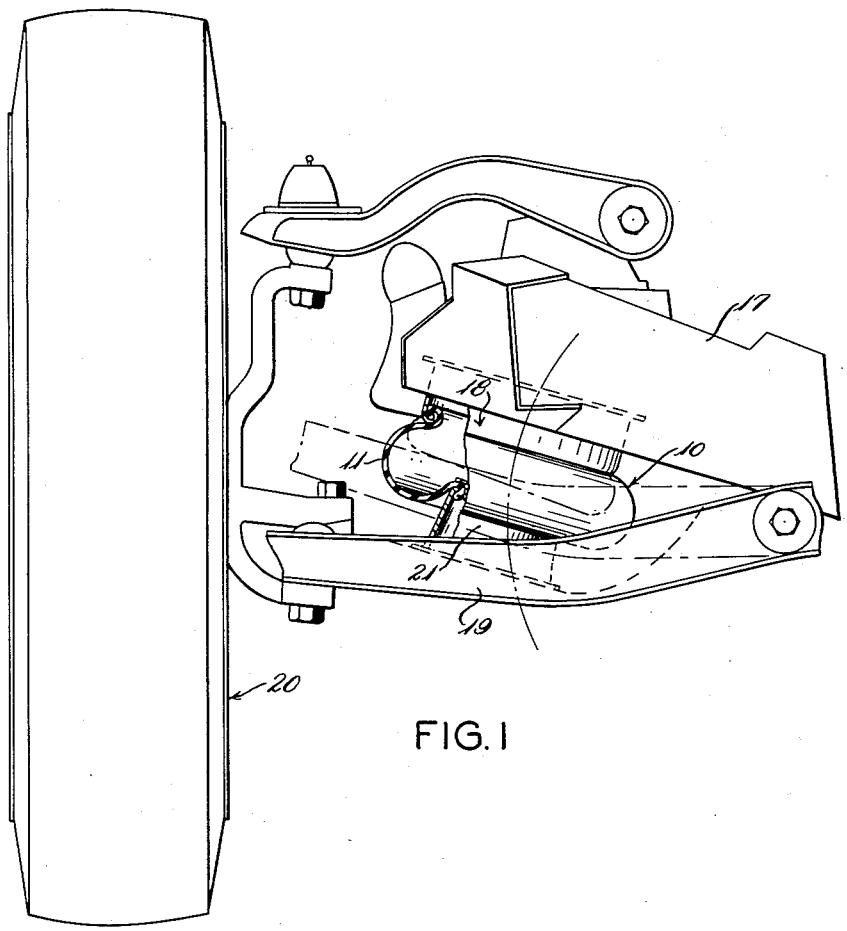
Figure 1 is a front elevation, partly in section, of an air spring manufactured according to the present invention and shown assembled in a typical front wheel suspension of an automobile.

The present invention is described with respect to the building of a single convolution air spring of the type illustrated in Figure 1 where it is shown assembled in an automotive wheel suspension. The air spring, referred to generally at 10, has a single convolution body 11 of rubberized plies 12 and 13 which terminate in inextensible beads 14 and 15 of different diameters. The large bead 14 is secured to the frame 17 of the automobile by means of a reservoir assembly 18, while the small bead 15 is secured to an arm 19, which helps to carry the wheel 20, by means of a supporting member and associated structure indicated generally at 21.

When the wheel 20 strikes a bump in the road, the wheel and the arm 19 will rise upwardly with respect to the frame 17 causing the air spring to be compressed to a position such as that indicated by the dot-dash lines of Figure 1; and as the air spring compresses, the small bead 15 will move upwardly toward and in some cases will pass through the large bead 14 in a telescoping movement to reduce both the volume and the effective cross-sectional area of the air spring in such a manner as to effectively cushion the shock.

In this compression stroke of the air spring, the air pressures within the air spring will be in the order of about 100 to 150 pounds per square inch. In order to contain such pressures and yet be sufficiently flexible to undergo the type of flexing, such as that illustrated in Figure 1, the plies 12 and 13 are essentially weftless fabrics comprising about 16 nylon warp cords per inch which are coated with rubber in conventional fashion. The ends of the plies are wrapped about and anchored to metal bead rings 24 and 25 which form the cores of beads 14 and 15, respectively. The cords of one ply cross the cords of the other ply and extend at equal but opposite angles of about 15° to the axis of the air spring. A liner 26, preferably of neoprene, is usually provided.

In the present example, the length of the nylon cords from bead to bead, is about 9¾ inches, and the large bead 14 has an inside diameter of about 4¾ inches while the small bead 15 has an outside diameter of about 3 inches, the difference in bead diameters being of this magnitude in order to provide the telescoping movement and the desired change in the effective area which results from the flexing of the air spring. In the vulcanized condition, the wall thickness of the air spring, which is the sum of the thicknesses of the inner liner 26 and plies 12 and 13, is about 3/16 of an inch.

Figure 2:
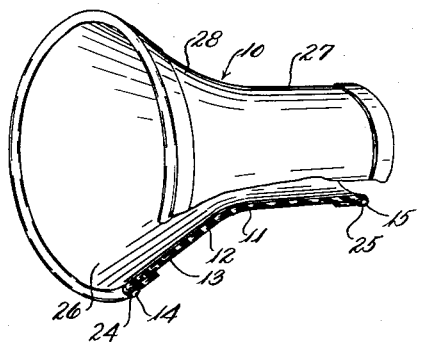
Figure 2 is a perspective view of an unvulcanized single convolution air spring, of the type shown in Figure 1, just after it has been removed from the building drum prior to the molding and vulcanizing operation.
Figure 8:
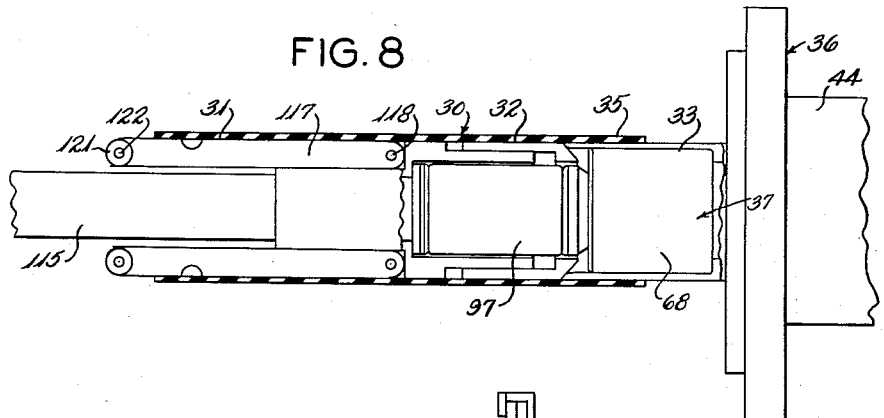
Figures 8–13 are diagrammatic longitudinal sectional views illustrating the various steps in the operation of the drum.

According to the present invention, the air spring just described is molded from an unvulcanized or "green" air spring having a bell-shape such as that in perspective in Figure 2, which is characterized by a cylindrical portion 27 of substantial length extending from adjacent the small bead 15 and merging into a flaring, slightly concave, portion 28 which extends outwardly and terminates in large bead 14. It will be noted that the cylindrical portion 27 turns inwardly in diameter to the small bead 15. An unvulcanized air spring of such shape is then molded to the shape shown in Figure 1. The construction provides a desirable balance of strength and flexibility.

The building drum generally

The air spring of Figure 2 is built upon a cylindrical building drum indicated generally at 30 which may be considered as being divided longitudinally into three portions. The left-hand portion 31, as viewed in the drawings, is expandable into conical form to form the flaring portion 28 of the air spring. The central drum portion 32 is of fixed diameter and it forms the cylindrical portion 27 of the green air spring. The right-hand drum portion 33 acts as an extension of the central portion 32 and provides a stitching surface for the end portions of the liner and of plies 12 and 13 which are later turned about the bead ring 25.

Initially the drum has the position shown in Figures 3–7 with the left-hand drum section 31 in contracted position and with the right-hand drum section 33 in position adjacent the central portion 32. The inner liner 26 and the plies 12 and 13 are then laid upon the drum and stitched together to form a cylindrical body having an end portion 35 which extends beyond the central section onto the right-hand drum section for a distance of about 2 inches. This end portion provides the stock which is turned about the bead ring 25. It is accordingly necessary to turn this portion 35 radially inwardly from an outer diameter of about 2⅝ inches, as laid upon the drum, to a diameter of about 1 15/16 inches to permit the bead ring 25 to be set in place over the plies against the shoulder of the drum. To accomplish this, a ply-turning or ply-contracting mechanism, indicated generally at 36, and a bead-setting mechanism, indicated generally at 37, are employed.

The ply-contracting mechanism

The ply-contracting mechanism 36 consists of two virtually identical units 38a and 38b, which will be referred to hereafter as the inner and outer iris units, respectively, each having a plurality of fingers 39 which are movable in a radially inward direction upon the plies to constrict the plies to a smaller diameter. The inner unit 38a in its operative position, as shown in Figure 17, is located close to the outer shoulder 40 of the building drum section 32 so that the fingers of the unit will engage the plies close to the shoulder of the drum to force them inwardly with a controlled wrinkling of the plies, see Figure 17.

The outer unit 38b is operated independently of the inner unit and is spaced axially about ½ inch from the first unit toward the edge of the plies; it operates to contract the plies close to their end edges so as to counteract the tendency of the ply ends to spring back toward their original diameter, this spring-back being apt to occur if only the inner iris unit 38a is used. Although a certain amount of wrinkling of the plies takes place as the iris units contract them, these wrinkles are later removed when the plies are turned back around the bead ring 25.

The assembly of the two iris units to form a unitary construction may take any one of a number of forms. In the present example, the two units comprise a pair of central plates 41 and 42 which are secured together by machine screws 43, see Figure 17. The units are supported by and held fixed against rotation by mounting them on a supporting sleeve 44. The manner in which the sleeve 44 and iris units are supported and moved into and away from operating position will be described later.

Since the iris units are virtually identical, only the inner unit 38a will be described in detail. Where possible, the same reference numerals will be applied to corresponding parts of both iris units.

Figure 18:
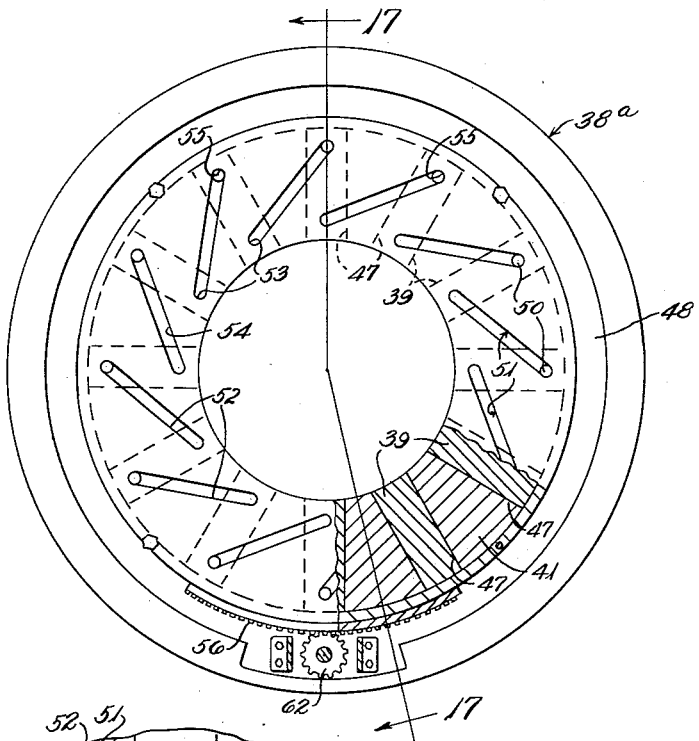
Figure 18 is an end elevation partly in section of the ply-contracting mechanism of Figure 17, with the fingers being shown in retracted position, the scale being somewhat smaller than that of Figure 17.
Figure 19:
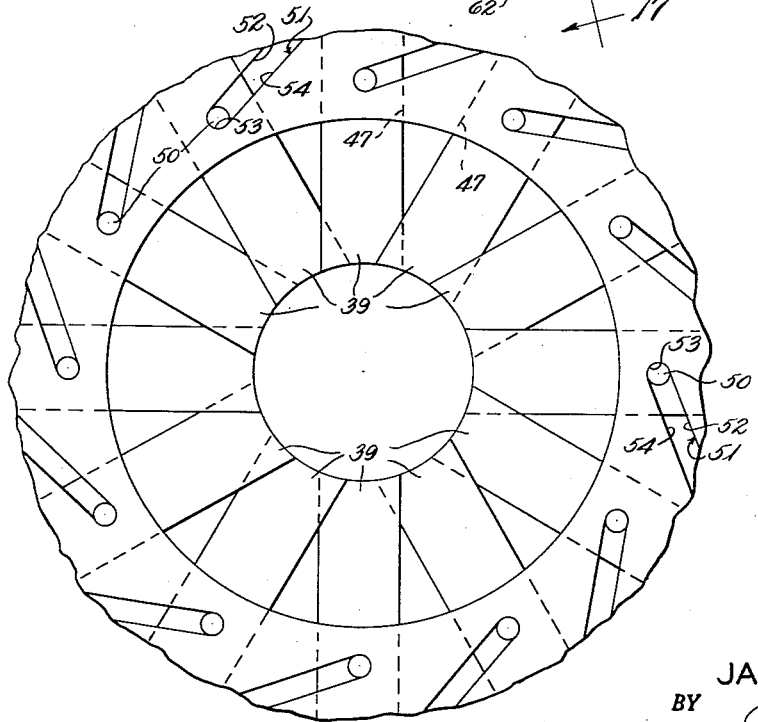
Figure 19 is a fragmentary end elevation of the ply-contracting mechanism of Figures 17 and 18 and showing the fingers contracted inwardly upon the plies, the view being on a still larger scale than that of Figure 18.

As best shown in Figures 17 and 18, the central plate 41 of iris unit 38a has a plurality of radial slots 47 which hold the fingers 39. The fingers are given their required radial movement by means of a cam ring 48 having a flanged edge construction 49 which enables it to be journalled upon the plate 41 in the manner shown in Figure 17. The cam ring has a limited rotational movement upon the plate 41 which is translated into radial movement of the fingers 39 by axial projections or pins 50 which are fixed to the fingers and which extend into diagonal slots 51 in the cam ring. The action is such that when the cam ring is turned clockwise, as viewed in Figure 18, the pins will be forced to move radially inwardly by the outer edges 52 of the slots until the pins strike the inner ends 53 of the slots, see Figure 19. When the cam ring is turned counter-clockwise, the inner edges 54 of the slots will force the pins to travel outward along the slot to the outer ends 55 and thereby bring the fingers 39 back into their radially outermost positions.

Preferably the iris units are rotated by similar segmental gear arrangements comprising segmental gears 56 and 57 respectively extending over about 45° of arc and mounted on brackets 58 and 59 which are secured respectively to the fixed plate 41. The segmental gears are operated by the independent rotary air cylinders 60 and 61 acting through pinion gears 62 and 63. With this arrangement the iris units can operate either simultaneously or separately. By using pneumatic cylinders the pins 50 will act effectively as stop members when they strike the ends of the slots 47 and will thereby limit the positioning of the fingers 39 to the desired fully closed and fully opened positions.

The fingers 39 are shaped so that when they are fully closed they will intermesh with each other to produce a smooth, unbroken surface in contact with the plies. Each finger is about 2 inches long, about ½ inch wide and about ¼ inch thick and is triangularly notched, as indicated at 65, at each side to a depth of about half the thickness of the finger with the notches extending to the ends of the fingers so as to produce the staggered-end effect best shown in Figure 20. These notches 65 permit the fingers to overlap each other at their ends at the extreme portion of their inward movement, see Figure 21 and particularly Figure 22. The ends of the fingers are also slightly concave across their ends. The result is that, when the fingers are moved to the full limit of their inward movement, they define a complete and virtually uninterrupted circular (or rather cylindrical surface) to engage the plies, see also Figure 19. This feature also tends to minimize the formation of wrinkles in the plies.

*The drum section 33 and bead-setting mechanism*

To set the small bead ring 25, a tube 68, is mounted for axial movement within drum section 33, see Figures 5 and 7. The tube 68 fits snugly within the drum section 33 and normally it is positioned so that its end 69 lies a substantial distance within the section 33. The drum section has an inside diameter only slightly larger than the bead ring 25. The section 33 and tube 68 thus cooperate to receive and center the bead ring 25 which is manually set in place against the sleeve end 69 when the drum sections 32 and 33 are separated prior to the building operation.

Figure 9:
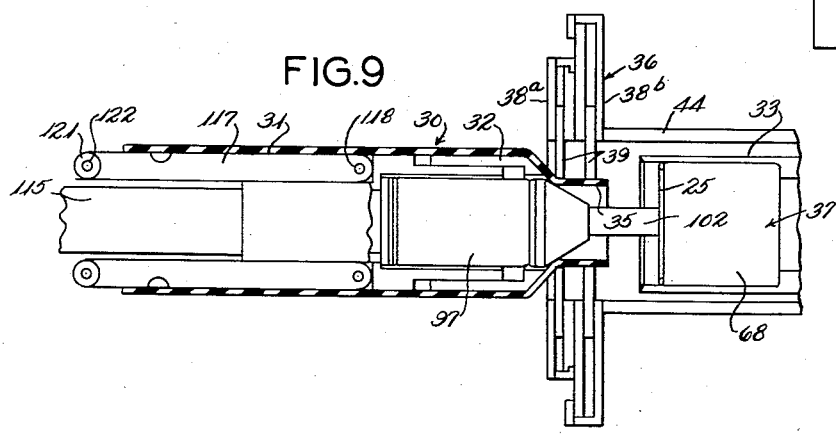
Figure 10:
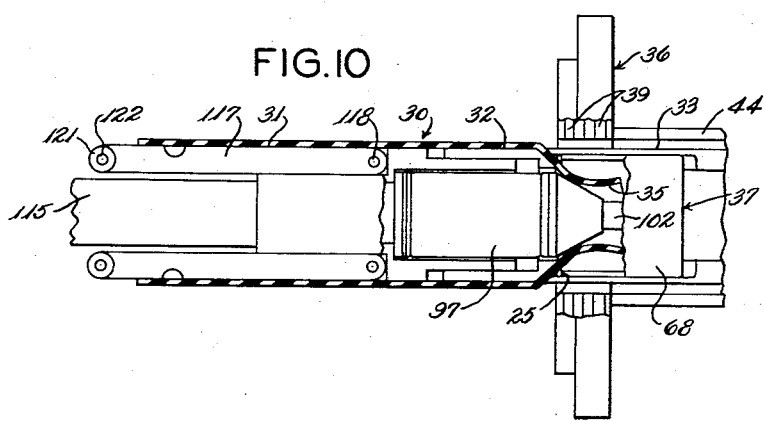

After the drum section 33 has been withdrawn to the right, and the plies contracted as shown in Figure 9, the iris unit 38b is opened and the tube 68 is immediately moved to the left within the drum section to carry the bead ring over the ends of the inturned plies. The iris unit 38a is then opened and the tube is moved further to the left to set the bead ring forcibly against the plies at the shoulder of the drum, see Figure 10. The bead ring will become slightly embedded in and will adhere to the tacky plies so that it will remain in place when the tube is withdrawn.

*The supporting structure for the ply-contracting and bead-setting mechanism*

The drum section 33, the bead setting tube 68 and the iris units 38a and 38b are all supported by and moved into position by a carriage 71 which is mounted for longitudinal movement on a suitable base 72 at the right side of the drum, see Figures 3 and 4. The body of the carriage consists of the large sleeve 44, referred to above, on which the iris units are directly mounted. A pair of longitudinal flanges 73 and 74 which extend downwardly from the sleeve 44 each have pairs of rollers 75 journalled thereon, the rollers riding on longitudinal rails 76 at the sides of the base. The carriage is moved longitudinally by a threaded nut 78 which is secured to the carriage and which engages a threaded rod 79 extending along one side of the base. The threaded rod is turned by an electric motor 80 operating through a speed reducer not shown. Rotating the rod in the one direction will cause the carriage to move leftwardly toward the building drum, while rotating it in the other direction will draw the carriage to the right away from the building drum.

The drum section 33 is bodily moved by the carriage but it also is given relative movement with respect to the carriage. To accomplish this, the drum section is journalled by means of a bearing 82 on a rightward extension 83 of the bead-setting tube 68 which in turn is mounted by bearings 84 and 85 on a central supporting shaft 86. The shaft 86 is supported within the sleeve 44 by spaced bearings 87 and 88. In order to move the drum section 33 and the bead setting tube 68 independently of the carriage, the shaft 86 is moved in and with respect to the carriage by a pair of pneumatic cylinders 89 and 89a, which are mounted along the sides of the carriage and which act through a yoke 95 affixed to the outer end of the shaft 86. Flexible conduits, not shown, supply air to the cylinders 89 and 89a.

As mentioned above, bead ring 25 is set in place by movement of the tube 68 to the left. To do this, it is necessary, in this embodiment of the invention, to provide relative movement of the drum section 33 and the bead-setting sleeve. Accordingly, the bearing 82 of the drum section has sliding movement on the extension 83 as indicated in Figures 5 and 7. Normally the drum section 33 is held in its full left position, as determined by the abutment of the radial flanges 90 and 91 on the section and bead-setting sleeve, respectively, by a coil spring 93 which is positioned around extension 83 and compressed between bearing 82 and a thrust bearing 94 on the shaft. When the central shaft 86 is moved leftwardly to set the bead ring 25, the drum section 33 will first strike the central drum section 32 and then the shaft 86 will continue to move to the left through the drum section until the bead ring is set, this relative movement being permitted by the compression of the coil spring 93.

*The ply turn-up mechanism*

Figure 12:
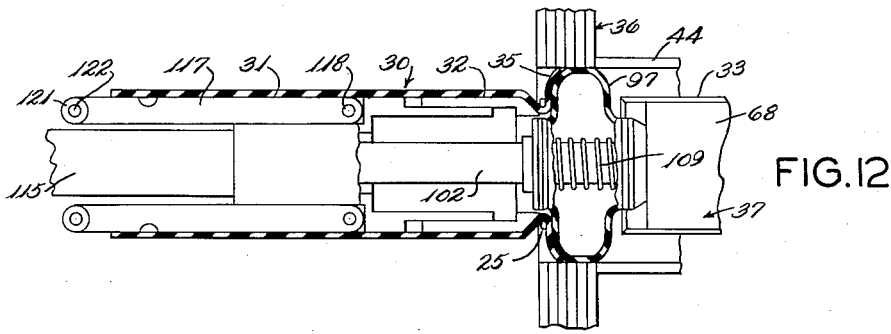
Figure 13:
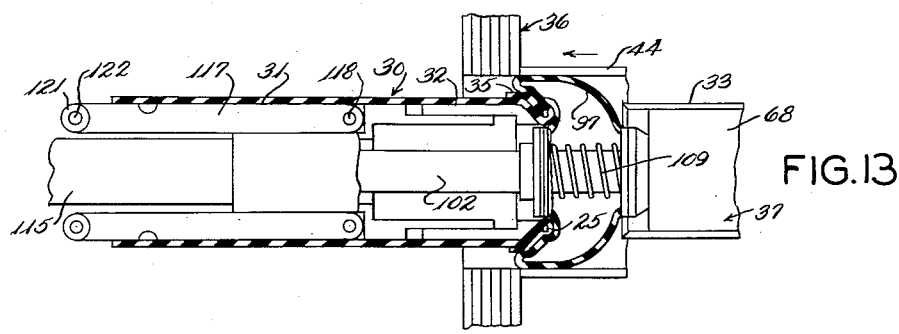

After the bead ring 25 has been set in place against the plies at the shoulder of drum section 32, the ply ends are turned up around the bead ring by means of an inflatable bag 97 which is expanded against the plies in such a manner as to turn the plies, first outwardly, as shown in Figure 12, and then axially around the beads as shown in Figure 13. The bag 97 is in the form of a cylindrical rubber sleeve, the ends of which are clamped between two pairs of circular clamping plates 98, 99, 100 and 101, respectively, see Figure 7. The outer pair of plates 98 and 99 is fixed to a central or inner supporting shaft 102 of the drum by the arrangement shown in Figure 7 in which the inner plate 99 of the pair has an axial flange 103 threaded upon the shaft and the outer plate 98 is threaded upon the external threads 104 of the axial flange 103. The inner pair of plates 100 and 101 is mounted for sliding movement on the inner shaft 102, the inner plate 100 having an axial flange 105 having a sliding fit as indicated at 106 on the central shaft 102, the outer plate 101 being threaded upon external threads 108 of the axial flange 105. The construction and operating movements of the shaft 102 will be described in detail later. A coil spring 109, which encircles the shaft 102 and is compressed between the pairs of clamping plates, serves to keep the plates apart and the bag 97 longitudinally extended as shown in Figure 7. The rubber bag or sleeve is thus normally stretched taut, by the spring 109 so that it can be housed within the drum section 32 when it is not in use.

Figure 11:
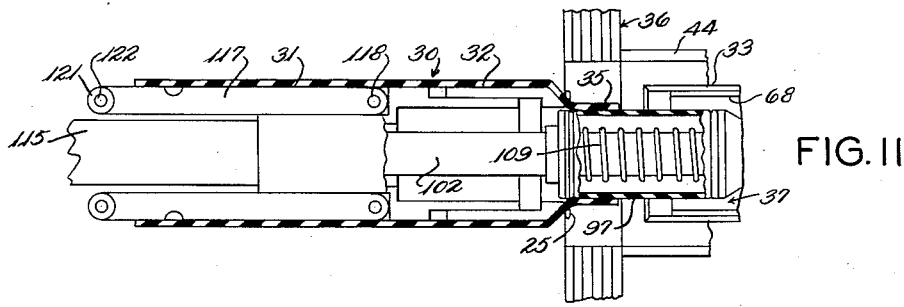

The bag 97 is moved axially out of the drum section 32 into ply-turning and stitching position by moving the shaft 102 to the right until the end plates 100 and 101 are positioned within the bead ring 25, see Figure 11. In this movement of the bag, the bag will bring the ply ends out into approximately cylindrical form. In the next step, see Figure 12, the bag is inflated by introducing air into the bag under a pressure of about 10-20 pounds per square inch through a suitable conduit such as the passage 111, see Figure 7, which extends through the shaft 102 and opens into the bag by a lateral passage 112. After the bag has inflated outwardly to force the plies into an approximately radial position as shown in Figure 12, the end plates are brought closer together by moving shaft 102 back to the left while the sleeve 44 (which supports the iris units) is moved into position to restrict the outward inflation of the bag. After the bag is inflated into contact with the interior surface of sleeve 44, the sleeve is moved to the left carrying the bag with it, and in doing so, the plies are forced tightly about the bead ring 25, see Figure 13. The air pressure in the bag is then relieved and the sleeve 44 is withdrawn to the right as the bag is deflated and as the end plates are returned by spring 109 to the initial spacing of Figure 11. The collapsed bag is then retracted within the drum section, its role of ply-turning and stitching completed. The required movements of the sleeve 44 are produced by moving the carriage 71 as described above.

*The ply expanding mechanism for the large bead*

The left-hand drum section 31 has a heavy tubular body portion which is mounted as indicated at 114 for rotation upon a tubular driving shaft 115. The outer cylindrical surface of this drum section has six longitudinal slots 116 spaced about the periphery, each of which holds a bar 117 which is pivoted at its inner end upon a pin 118 which extends through a hole drilled through the body of the drum section. The outer surfaces of the pivotal bars 117 together with the longitudinal land portions 120 between the bars form a substantially unbroken cylindrical surface upon which the inner liner and plies can be readily assembled. Each bar 117 has a roller 121 which turns freely upon a pin 122 extending through the bar at its outer end and projecting beyond the roller for an appreciable distance on each side of the roller.

After the plies are assembled upon the drum, the left-hand portion of the air spring body is expanded into conical form by pivoting the bars 117 in unison outwardly in a radial direction. The bars are given this pivoting movement by a conical expanding member or mandrel 125 which is moved axially toward and over the drum section 31 in such a manner that cam surfaces on the mandrel engage the rollers 121 at the outer ends of the pivotal bars and swing the bars outwardly about the pivotal pins 118.

Figure 23:
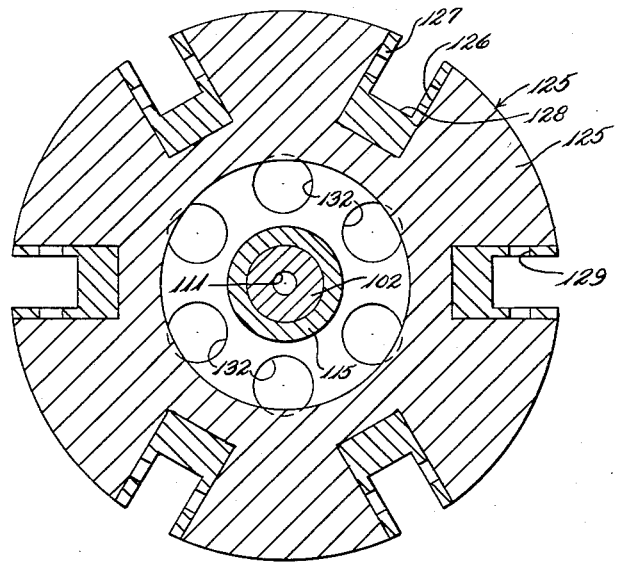
Figure 23 is a transverse sectional view of the ply-expanding mandrel at the left of the building drum, the view being taken in the plane indicated by the lines 23—23 in Figure 5 and being shown on a somewhat enlarged scale.

The expanding mandrel is a conical body having a number of slots 126 which correspond in number and in position to the pivotal bars and which are aligned axially therewith. Each slot 126 has a channel-shaped member 127 best shown in Figure 23 which is fixed to the body of the mandrel by any suitable means such as machine screws. The channels provide the cam surfaces, referred to above, which expand the pivotal bars. The bottom surfaces 128 of the channels provide cam tracks for the rollers 121 and the sides of the channels are slotted as indicated at 129, in the manner shown in Figure 23, to receive the pins 122 which support and guide the rollers. The pins 122 by their relatively snug fit within the slots 129 serve to hold the bars against the action of centrifugal force throughout the building cycle. The radial position of the bars 117 is thereby controlled by the position of the pins in the slots of the channel members. Thus when the drum is rotating in its initial position of Figure 5, the centrifugal force exerted on the bars is resisted by the pins 122 which at this moment are positioned in the inner ends of the slots. As the expanding of the bars takes place, the centrifugal force imparted to the bars is resisted by the continuous engagement of the pins with the edges of the slots 129 as they slide upwardly in the slots.

As will be explained later, the expanding mandrel is rotated by virtue of its interlocking engagement with drum section 31, it being noted from Figure 5 that in addition to the engagement of the bars 117 in the cam slots 126, the ends 131 of the channels 127 project into the slots 116 in the drum section.

Figure 24:
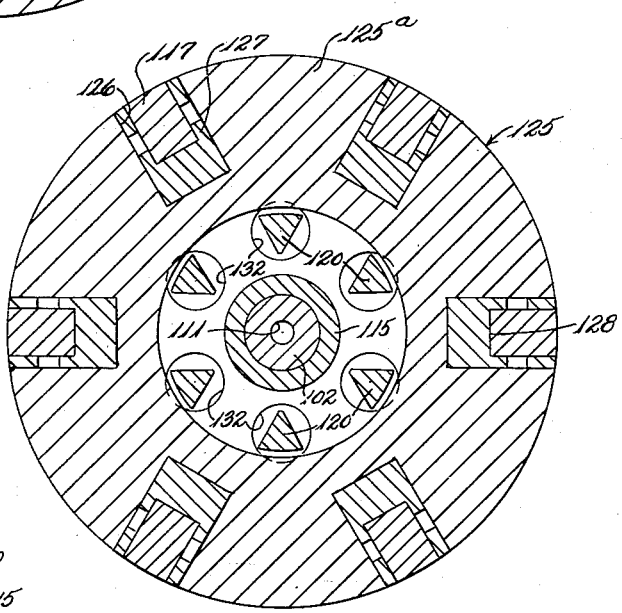
Figure 24 is a view similar to Figure 23 showing the same section of the ply-expanding mandrel but with the mandrel in the position of expanding the plies.
Figure 25:
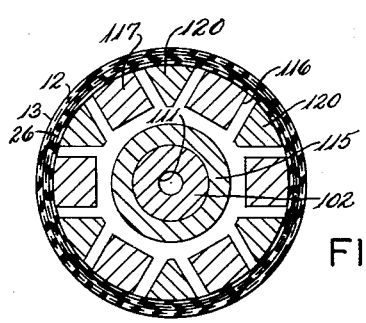
Figure 25 is a transverse sectional view taken in the plane indicated by the lines 25—25 in Figure 5 and shown in the enlarged scale of Figures 23 and 24.

In order to enable the expanding mandrel 125 to move completely over the drum section 31, the hub portion of the mandrel has six longitudinal holes 132 drilled to a depth slightly greater than the length of the land portions 120 of the drum section. These holes are shown in dotted lines in Figure 5 and in end elevation in Figure 23. When the mandrel is moved in upon the drum, the land portions will pass into the holes as the bars swing out, see Figure 24.

When the expansion of the drum section 31 is complete, the outer surfaces of the pivotal bars 117 and the land portions 125a between the channels 127 of the expanding mandrel form a substantially unbroken conical surface to permit stitching of the plies about the large bead 15 as indicated in Figure 16. Also, in the expanded position of the parts, circumferential notches in the bars 117 and in the land portions 125a of the mandrel form an unbroken annular groove 135 which serves to receive the large bead ring 24 and hold it in position during the turning of the plies about the ring. This ply-turning operation will be described below. Preferably the large bead ring is held manually in the position where it will be seated in groove 135 as the drum is expanded.

After the plies have been turned and stitched about the bead ring 24, the drum section 31 is contracted by withdrawing the mandrel 125 to the left as viewed. As this takes place, the cam slots 129 in the channels 127 will force the pins 122, and hence the outer ends of the pivotal bars, progressively inwardly until the pins reach the inner ends of the channel slots at which time the bars are fully retracted and the drum section is ready for the next building cycle.

*The turning of the expanded plies*

In order to turn the expanded plies about the bead ring 24, the land portions 125a of the expanding mandrel between the channels are terminated just beyond the groove 135 which holds bead ring. The resulting spaces between the outer ends of the channels permit the operating movement of a ply-turning tool 137 which comprises a sleeve having a number of circumferentially spaced arcuate teeth 138, Figures 3 and 4, which project from the end of the sleeve and fit between the channel members. Normally the teeth are positioned to the left with the ends of the teeth out of contact with the plies, see Figure 14. To turn the plies, the sleeve 137 is moved to the right, as shown in Figure 15, by cylinders 160, 161 through yoke 162 and bearing 163, as shown in Figures 3, 4 and 6, until the teeth 138 engage the end portions of the ply portions which span the open spaces between the channels and turnt he plies into a cylindrical form around the bead 25. As these ply portions are turned, the entire circumference of the plies is of course also turned. The diameter of the sleeve 137 is such that the teeth will force the plies tightly around and against the bead ring 24 which remains in place in the groove 135 by virtue of its tight fit within the groove.

The ply-turning sleeve 137 is then withdrawn and the plies are stitched tightly about the bead by a conventional stitcher indicated at 139 in Figure 16. The stitching can be effectively performed because in this area the land portions 125a of the mandrel and the pivotal bars of drum section 117 form a continuous supporting surface for the stitching operation.

*The supporting structure for the building drum*

As mentioned above the building drum sections 31 and 32 and their associated mechanisms are supported by the tubular drive shaft 115 which is cantilever supported in longitudinally spaced bearings 141 and 142 mounted on a suitable base 143 at the left side of the apparatus. The tubular drive shaft 115 is driven by an electric motor 144 operating through a suitable transmission which includes a pulley 145 secured to the end of the shaft. The expanding mandrel 125 is journalled on (and hence not driven by) the drive shaft by means of a bearing 156, see Figure 6. It will be recalled that the mandrel is driven in its rotary movement by its engagement with drum section 31.

The central shaft 102 referred to above, fits within the tubular shaft 115 and is supported thereby, the central shaft extending beyond the end of the drive shaft 115 where it terminates in a bearing 147, see Figures 3 and 4, which is supported by a yoke 148. The yoke 148 transmits the force of a pair of air cylinders 149 and 150 which are mounted on base 151 and which operate to move the central shaft longitudinally to move the stitching bag 97 into the operative position and bring it back to idle position. The bearing 147 is such as to transmit the axial thrust of the air cylinders and still permit the idling rotation of the central shaft within the drive shaft. A rotary seal 152 at the end of the central shaft connects the passage 111, referred to above alternatively to a source of air under pressure or to a vacuum as may be desired in the operation of the stitching bag.

The expanding mandrel 125 is moved longitudinally on the hollow drive shaft 115 by a pair of air cylinders 153 and 154, see Figures 3 and 4, operating through a yoke 155 which is connected to the body of the mandrel through a bearing 156 which transmits the required axial force to mandrel while permitting it to rotate with the building drum.

*The molding of the air spring*

Figure 26:
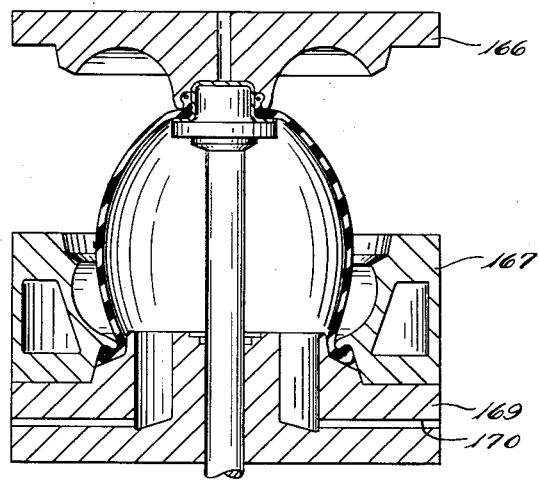
Figures 26 and 27 are diagrammatic sectional views illustrating the manner in which an air spring built according to the invention, such as that shown in Figure 2, is shaped and vulcanized in a mold.
Figure 27:
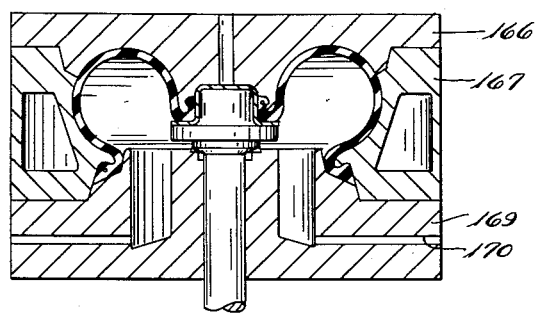

The air spring which is assembled in the manner described above takes the form shown in Figure 2 after it is removed from the building drum. From this form it can be molded and vulcanized to the finished form of Figure 1 by confining it in a suitable three-part mold such as that shown in Figures 26-27. The green air spring is collapsed axially by forcibly bringing the mold sections 166, 167 and 169 together in a closing movement from open position while the air spring is progressively inflated outwardly by fluid under a pressure of about 5-20 pounds per square inch which enters the mold through conduit 170, see Figure 26 which shows the mold in an early stage of the closing movement and just as the inflation begins. When the mold is fully closed as shown in Figure 27 the air spring wall will have been forced out into contact with the mold and the beads will be clamped between appropriate molding surfaces, as shown. Thereafter the application of heat and pressure to the air spring completes the vulcanization.

While the invention has been described with reference to the manufacture of a specific air spring, it will be apparent that it can be adapted to the building of many different types of air springs, differing in material, shape and dimensions. Thus, within relatively wide limits, it is not necessary that the air spring to be manufactured have any particular wall thickness, overall length bead diameter, or that it be made of specific materials. Many design features of the air spring building drum and associated apparatus may likewise be varied and modified within the scope of the invention, the essential features of which are summarized in the appended claims.

What is claimed is:

1. Apparatus for manufacturing an air spring having a single convolution wall comprising flexible ply material, the ends of which terminate in a large bead and a small bead, respectively, the small bead being of a diameter enabling it to telescope completely through the large bead when said air spring is fully deflected, said apparatus comprising a normally cylindrical drum upon which said ply material is formed into an initially cylindrical body, said drum having a diameter larger than the diameter of said small bead and smaller than the diameter of said large bead, means to withdraw a portion of said drum from a position of support for the end portion of said cylindrical body leaving said end portion of ply material projecting axially from the remaining shoulder of said drum, a first means to contract said one end portion radially inwardly and then around a substantially inextensible ring to form said small bead and means to expand the other end portion radially outwardly and then around a second, substantially inextensible ring to form said large bead, said first means comprising a mechanism encircling said drum and having a plurality of radial fingers grouped in a circle about said drum, said fingers normally being arranged with their inner ends positioned in a circle having a diameter greater than said drum diameter and means to move said fingers radially inwardly until their inner ends lie in a circle substantially smaller than said drum diameter.

2. Apparatus according to claim 1 in which said fingers have contact with inwardly directed guiding surfaces as said fingers move radially inwardly.

3. Apparatus according to claim 2 in which said fingers are positioned within radially extending slots in an annular supporting member.

4. Apparatus according to claim 3 in which said fingers have axially extending surfaces and includes a rotatable cam member engaging said surfaces to move said fingers radially inwardly and outwardly, respectively, as said cam member is rotated in opposite directions.

5. Apparatus according to claim 4 in which said fingers have axially extending pins to form said surfaces, said pins extending within angularly inclined grooves in said rotatable cam member.

6. Apparatus according to claim 1 in which said fingers are notched at their ends for full intermeshing engagement when the fingers are in their radially innermost positions whereby said fingers present an effective continuous circumferential surface engaging said ply material.

7. Apparatus according to claim 1 in which said first means comprises a pair of axially spaced mechanisms encircling said drum, each mechanism having a plurality of radial fingers grouped in a circle about said drum and movable radially inwardly to engage and contract said end portions of said ply material radially inwardly.

8. Apparatus according to claim 1 in which said first means comprises a mechanism engaging said end portion of said ply material to contract it immediately adjacent said drum shoulder.

9. The apparatus of claim 8 in which said first means also comprises a second contracting mechanism engaging said ply material axially spaced from said drum shoulder at a point close to its outer end.

10. Apparatus according to claim 1 in which said first means comprises a mechanism encircling said axially projecting ply end portion of ply material and contractable upon said end portion to force it into a form of substantially smaller diameter than said building drum and means to set said first-mentioned ring against said contracted end portion at said drum shoulder.

11. Apparatus according to claim 1 in which said first means includes means to turn said end portion radially inwardly and expansible means to turn said ply material back radially about said first-mentioned ring.

12. The apparatus of claim 1 in which said expanding means comprises a plurality of bars set in the outer surface of said drum with their outer ends free to swing outwardly about their inner ends as hinge points.

13. Apparatus according to claim 12 in which said bars are expanded outwardly in a swinging movement by a conical member axially movable into engagement with said bars.

14. Apparatus according to claim 13 in which said conical member and bars are engaged during the rotation of said drum whereby said conical member and drum rotate together.

15. A mechanism for expanding a cylindrical body of flexible rubberized fabric into flared form comprising a rotatable cylindrical drum supporting said fabric body internally, said drum comprising a plurality of longitudinally extending bars spaced apart circumferentially of said drum and pivoted at their inner ends for swinging movement outwardly in a radial direction, land portions between said bars completing the outer cylindrical surface of said drum, a conical mandrel movable axially with respect to said drum and having a plurality of slots corresponding to said pivotal bars in number and in angular position the outer ends of said bars riding within said slots and being cammed outwardly about their pivoted ends by the relative axial movement of said mandrel and drum until said bars lie within said slots, respectively, when said mandrel has been moved completely onto said drum, said mandrel having a plurality of drilled holes to receive said drum land portions as said relative axial movement takes place and said mandrel having land portions between said slots to complete a substantially unbroken conical surface with said bars at the conclusion of said relative axial movement.

16. The mechanism of claim 15 in which said slots have channel members secured therein to receive said bars.

17. The mechanism of claim 16 in which said channel members have longitudinally extending undercut portions and said bars have means extending from their outer ends into the undercut portions of said channel members for sliding movement therein to restrain said outer bar ends from moving outwardly under the action of centrifugal force.

18. A mechanism for contracting the end portion of a cylindrical body of flexible material into an annular portion of substantially smaller diameter, said mechanism comprising an annular plate having a plurality of circumferentially spaced, radially extending grooves, fingers lying within said grooves with the inner ends normally lying in a circle having a diameter greater than the diameter of said body, and means to force said fingers radially inwardly until their inner ends lie in a circle substantially equal in diameter to said annular portion.

19. The mechanism of claim 18 in which the inner ends of said fingers are notched on at least one side whereby said finger ends intermesh with each other in the fully contracted position of said fingers.

20. The mechanism of claim 19 in which the inner ends of said fingers have triangular notches at opposite corners permitting said ends to intermesh in the fully contracted position of said fingers to form a substantially continuous inner cylindrical surface in contact with said annular portion.

21. The mechanism of claim 18 in which said means comprises a cam ring lying closely adjacent said first plate, means to rotate said cam ring, and means on said fingers and said cam ring effective upon said rotation to move said fingers radially in said grooves.

22. The mechanism of claim 21 in which said finger-moving means comprises projections extending axially from said fingers into and between diagonally extending surfaces on said cam ring.

23. The mechanism of claim 21 in which said cam ring is journalled on said first plate.

24. The mechanism of claim 21 in which said finger-moving means comprises diagonally extending slots in said cam ring and pins extending axially from said fingers respectively into said diagonal slots.

25. A mechanism for expanding a cylindrical body of rubberized fabric into a flaring form and thereafter turning the end portion of said form about a bead ring, said mechanism comprising a plurality of longitudinal bars initially supporting said fabric body; means to expand said bars outwardly to force said fabric body into said flaring form and into contact with a bead ring adjacent the end of said body, and a tubular member having a diameter slightly larger than said bead ring, means to move said tubular member axially over said bead ring while said bars support said ring against dislodgment to turn the end portion of the fabric body extending beyond said bead ring around said ring into a substantially cylindrical form and means to stitch said turned end portion tightly about said bead ring.

26. A mechanism according to claim 25 in which said member is notched at the end thereof to have a plurality of axial extending teeth, means to move said tubular member axially over said mandrel with said teeth entering the spaces between said bars and engaging the portions of the plies extending outwardly beyond said bead ring and spanning the distance between said bars.

27. A mechanism for expanding a cylindrical body of rubberized fabric into a flared form comprising a cylindrical drum supporting said fabric body internally, a plurality of longitudinally extending bars spaced about the circumference of said drum and pivoted at their inner ends for swinging movement outwardly in a radial direction, land portions between said bars completing the outer cylindrical surface of said drum, and means to cam said bars outwardly about their pivoted ends to expand said fabric in conical form.

28. A mechanism according to claim 27 in which said bars have circumferentially extending grooves adapted for circumferential alignment when said bars are fully expanded.

29. A mechanism for expanding a cylindrical body of flexible rubberized fabric into flaring form comprising a cylindrical drum supporting said fabric body internally, said drum having a plurality of longitudinally extending bars spaced apart circumferentially and pivoted at their inner ends for swinging movement outwardly in a radial direction, a conical mandrel movable axially with respect to said pivotal bars to cam them outwardly about their pivoted ends and expand said fabric into a conical surface.

30. A mechanism for expanding a cylindrical body of rubberized fabric into flared form comprising a cylindrical drum supporting said fabric body internally, said drum comprising a plurality of longitudinally extending bars spaced apart circumferentially and pivoted at their inner ends for swinging movement outwardly in a radial direction, a conical mandrel movable axially with respect to said bars and having a plurality of slots corresponding to said pivotal bars in number and in angular position, the outer ends of said bars riding within said slots and being cammed outwardly about their pivoted ends by the relative axial movement of said mandrel and bars until said bars lie within said slots, respectively, when said mandrel has been moved completely onto said drum, whereby said bars expand said fabric outwardly into flaring form.

31. A mechanism according to claim 30 in which said pivoted bars and the lands between the grooves of said mandrel have circumferentially grooved portions adapted to form a continuous circumferential groove when said bars are fully expanded.

32. A mechanism for expanding a cylindrical body of rubberized fabric into a flaring form and thereafter turning the end portion of said form, said mechanism comprising a plurality of circumferentially arranged longitudinal bars set in a drum surface and initially supporting said fabric body; means to expand said bars outwardly to force said fabric body into said flaring form.

References Cited in the file of this patent

UNITED STATES PATENTS

| | | |
|---|---|---|
| 1,757,750 | Stevens | May 6, 1930 |
| 1,921,594 | Thompson | Aug. 8, 1933 |
| 2,182,176 | Maranville | Dec. 5, 1939 |
| 2,409,974 | Breth et al. | Oct. 22, 1946 |
| 2,455,038 | Breth | Nov. 30, 1948 |
| 2,608,497 | Breth | Aug. 26, 1952 |
| 2,614,952 | Kraft | Oct. 21, 1952 |
| 2,649,892 | Appleby | Aug. 25, 1953 |
| 2,838,091 | Kraft | June 10, 1958 |